Oct. 8, 1929.  C. W. FISHER  1,730,360
LIQUID FUEL STRAINER
Filed May 3, 1926
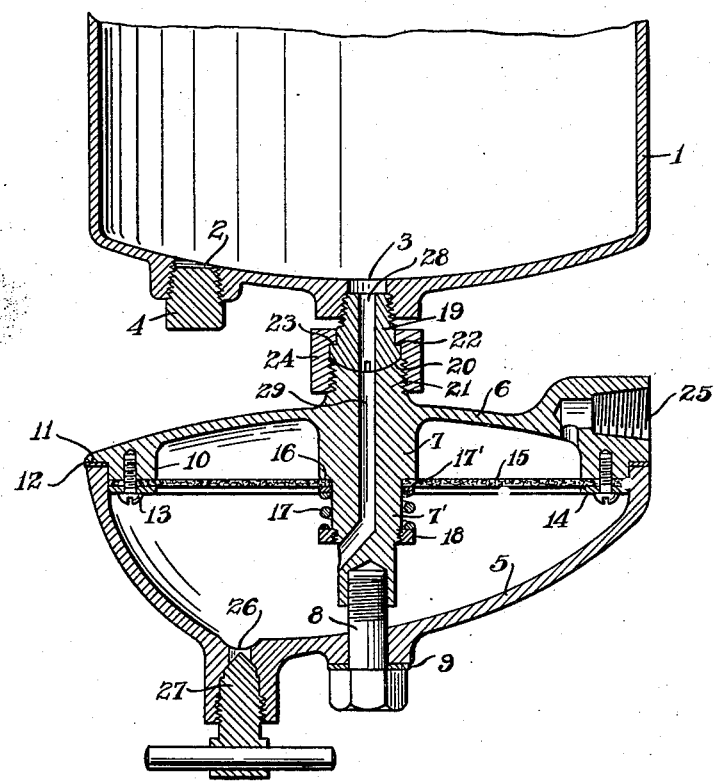
INVENTOR
BY Charles W. Fisher
ATTORNEYS Patented Oct. 8, 1929

1,730,360

UNITED STATES PATENT OFFICE

CHARLES W. FISHER, OF SPRINGFIELD, OHIO, ASSIGNOR TO ALEMITE CORPORATION, OF CHICAGO, ILLINOIS, A CORPORATION OF DELAWARE

LIQUID-FUEL STRAINER

Application filed May 3, 1926. Serial No. 106,210.

My invention relates to strainers for liquid fuel, it more particularly relating to a strainer for gasolene or similar fuel for automobiles, and especially to a strainer which can be attached to the tank of a vacuum feed system.

The object of my invention is to provide a strainer of simple and inexpensive construction which can be readily applied to the tank of a vacuum feed system for motor vehicles and which will be effective for the purpose of straining the fuel before the fuel is fed to the carburetor.

In the accompanying drawing:

The figure is a vertical section of a portion of the tank of a vacuum feed system and my improved strainer shown applied thereto.

Referring to the drawings, 1 represents the lower part of the tank of a vacuum feed system and 2 and 3 the usual outlet openings of the tank. The opening 2 is the usual outlet opening to which is connected the pipe which leads to the carburetor, but in the present case I close this opening by a removable plug 4. The opening 3 is the usual drain opening, but in the present case I have employed this drain opening as the point of attachment for my improved strainer, particularly because it is centrally located with relation to the bottom of the tank, and at its lowest point.

The strainer has an outer casing formed of two parts, a lower cup-shaped portion 5 and a chambered cover portion 6, preferably circular in form. The cover portion has a centrally-arranged interior stem 7 and the portion 5 is connected with the lower end of this stem by a cap-screw 8 which extends through an unthreaded opening in the portion 5 and is threaded into the lower end of the stem; a gasket 9 being inserted between the head of the screw and the casing 5 to prevent leakage. The cover 6 is also provided with an annular rib 10 removed from the outer edge thereof so as to provide a shoulder to receive the edge of the casing 5, a gasket 11 being interposed at this point to prevent leakage. Secured to the under side of the rib 10 by a series of screws 13 is a metallic ring 14 which has fastened thereto in any suitable way the straining element, shown in the present case as a circular piece of chamois skin 15, which is the preferred material. This chamois skin is preferably secured to the ring 14 by staples (not shown) so that the chamois and ring are formed as an assembled unit to make a straining element which can be supplied conveniently for repairs. The disk of chamois skin is centrally perforated to fit the stem 7, which is reduced as shown at 7' to provide a shoulder 16 against which the chamois skin is clamped by a coil spring 17 and nut 18 threaded on the lower end of the reduced portion of the stem; a washer 17' being preferably inserted between the spring and the straining element.

The cap 6 is connected to the tank by a doll-head fitting consisting of the tapered threaded plug 19 which is screwed into the tapered threaded opening 3 and having a convex surface 20 fitting the concave surface of the boss 21 of the cover and also provided with the shoulder 22 which co-acts with the interior shoulder 23 on the nut 24 which is screwed on the threaded exterior of the boss 21.

The cover portion 6 of the strainer also has a tapered threaded opening 25 to receive a fitting by which the pipe (not shown) which leads to the carburetor is connected. The lower portion 5 of the strainer casing has an opening 26 at its lowermost portion which is closed by the removable plug 27 so that the casing of the strainer may be drained when desired.

The doll-head fitting which connects the strainer to the tank forms a universal coupling which permits the strainer to be positioned correctly relative to the carburetor so that the supply line which connects with the opening 25 may go to the carburetor in the most direct way, and also by loosening the cap screw 8 the casing member 5 may be turned relatively to the cap 6 so as to position the drain plug 27 at the most convenient point.

In operation the liquid fuel from the tank passes through the passage 28 in the plug 19 and a passage 29 in the boss 21 and stem 7 into the casing 5 and then through the straining element 15 and thence to the carburetor through the opening 25.

By locating the strainer between the vacuum tank and the carburetor, all scale particles from the walls of the tank and water that condenses on the inside of the walls of the tank are removed from the fuel, as well as the fine sediment and water contained in the fuel itself.

Having thus described my invention, I claim:

A fuel strainer consisting of an upper casing member, a lower casing member having an eccentric drain opening, a shouldered stem formed integrally with said upper casing member and having a passageway therethrough to a point beneath its shoulder, a bolt passing through the lower casing member and threaded in the end of said stem for securing said casing members in any one of a plurality of positions of relative angular adjustment, a straining element extending across and closing the lower end of said upper casing member and abutting against the shoulder of said stem, and resilient means for holding said element against the shoulder of said stem.

In testimony whereof, I have hereunto set my hand this 1st day of May, 1926.

CHARLES W. FISHER.